United States Patent
Kim et al.

(10) Patent No.: US 8,463,067 B2
(45) Date of Patent: Jun. 11, 2013

(54) APPARATUS AND METHOD FOR IMPROVING VISIBILITY OF IMAGE

(75) Inventors: In-ji Kim, Yongin-si (KR); Hyun-wook Ok, Seoul (KR); Du-sik Park, Suwon-si (KR); Yang-ho Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1204 days.

(21) Appl. No.: 11/872,280

(22) Filed: Oct. 15, 2007

(65) Prior Publication Data

US 2008/0089604 A1  Apr. 17, 2008

(30) Foreign Application Priority Data

Oct. 17, 2006  (KR) .................. 10-2006-0100954

(51) Int. Cl.
- *G06K 9/40* (2006.01)
- *G06K 9/00* (2006.01)
- *G09G 5/02* (2006.01)

(52) U.S. Cl.
USPC .......................... 382/274; 382/167; 345/602

(58) Field of Classification Search
USPC .............. 382/162–167, 274; 345/153, 150, 345/154, 600, 603, 589; 348/602, 603, 179, 348/655; 358/518
See application file for complete search history.

(56) References Cited

U.S. PATENT DOCUMENTS

| | | | |
|---|---|---|---|
| 5,933,256 A | 8/1999 | Ebner | |
| 6,480,202 B1 * | 11/2002 | Deguchi et al. | 345/600 |
| 7,079,155 B2 * | 7/2006 | Kanai | 345/600 |
| 7,158,673 B2 * | 1/2007 | Nakabayashi et al. | 382/167 |
| 7,301,545 B2 * | 11/2007 | Park et al. | 345/594 |
| 7,330,190 B2 * | 2/2008 | Sasaki | 345/590 |
| 7,595,811 B2 * | 9/2009 | Matsuda | 345/690 |
| 7,671,901 B2 | 3/2010 | Masuda et al. | |
| 7,777,756 B2 * | 8/2010 | Kwak et al. | 345/589 |
| 7,872,658 B2 * | 1/2011 | Huh et al. | 345/589 |
| 7,969,478 B1 * | 6/2011 | Chen et al. | 348/223.1 |

FOREIGN PATENT DOCUMENTS

| | | |
|---|---|---|
| CN | 101189654 A | 5/2008 |
| EP | 0 961 408 A2 | 12/1999 |
| EP | 1 982 698 A1 | 2/2008 |
| JP | 11-75072 | 3/1999 |
| JP | 2003-333614 | 11/2003 |
| JP | 2006-243454 | 9/2006 |
| JP | 2006-267140 | 10/2006 |
| KR | 1999-122 | 1/1999 |
| KR | 20-154244 | 8/1999 |
| KR | 2001-10195 | 2/2001 |
| KR | 2002-11615 | 2/2002 |
| WO | 99/23637 | 5/1999 |

OTHER PUBLICATIONS

Hunt, R. W. G. (1989), Hue shifts in unrelated and related colours. Color Research & Application, 14: 235-239.*

(Continued)

*Primary Examiner* — Andrae S Allison
(74) *Attorney, Agent, or Firm* — Staas & Halsey LLP

(57) ABSTRACT

An apparatus and method for improving visibility of an image. The apparatus includes: an image input module receiving an image; an illuminance sensing module sensing external illuminance; a visibility compensating module compensating the input image by mapping the input image from a first color gamut to a second color gamut on the basis of the sensed external illuminance; and an image output module outputting the compensated image.

15 Claims, 10 Drawing Sheets

OTHER PUBLICATIONS

J. M. Kim, C. H. Son, and Y. H. Ha, "Illuminant adaptive color reproduction based on lightness adaptation and flare for mobile phone", IEEE International Conference on Image Processing (IEEE, Piscataway, NJ, 2006) pp. 1513-1516.*

Office Action issued in corresponding Korean Patent Application No. 2006-100954 dated Oct. 4, 2007.

Search Report issued Mar. 4, 2008 by the European Patent Office for European Patent Application No. 07118187.9-2202.

Condit. "Application of Characteristic Vector Analysis to the Spectral Energy Distribution of Daylight and the Spectral Reflectance of American Soils." Applied Optics, vol. 11, No. 1, Jan. 1972, pp. 74-86.

Fairchild. "Device-Independent Color Imaging." Color Appearance Models, Chapter 17, 1998, pp. 339-366.

Hunt. "Hue Shifts in Unrelated and Related Colours." Color Research and Application, vol. 14, No. 5, 1989, pp. 235-239.

Kim et al. "Illuminant Adaptive Color Reproduction Based on Lightness Adaptation and Flare for Mobile Phone." Image Processing, 2006 IEEE International Conference, Oct. 2006, pp. 1513-1516.

Chinese Office Action issued May 27, 2010 in corresponding Chinese Patent Application 200710181957.0.

Chinese Office Action mailed May 16, 2012 issued in corresponding Chinese Patent Application No. 200710181957.0.

Japanese Office Action issued Oct. 9, 2012 in corresponding Japanese Patent Application No. 2007-266593.

Japanese Office Action issued Feb. 5, 2013 for Japanese Patent Application No. 2007-266593.

* cited by examiner

APPARATUS AND METHOD FOR IMPROVING VISIBILITY OF IMAGE

CROSS-REFERENCE TO RELATED APPLICATION

This application claims the benefit of Korean Application No. 2006-100954, filed on Oct. 17, 2006 in the Korean Intellectual Property Office, the disclosure of which is incorporated herein by reference

BACKGROUND OF THE INVENTION

1. Field of the Invention

Aspects of the present invention relate to an apparatus and method for improving the visibility of an image, and more particularly, to an apparatus and method for improving the visibility of an image when an apparatus, such as a digital camera, a camera phone, or a camcorder, provides images in a high illuminance environment.

2. Description of the Related Art

In general, personal portable terminals, such as cellular phones and PDAs having "portability" and "mobility", allow users to view contents on a display screen in any kind of environment.

However, since an image displayed on a display screen of a personal portable terminal can be affected by the environment, such as illuminance and color temperature, the same image may look different according to the environment. Specifically, when the illuminance surrounding the display screen is more than the illuminance of the display screen, for example, outside during a sunny day, the visibility of the image displayed on the display screen is drastically reduced.

The reduction in the visibility may be one of the factors that diminish various merits of the personal portable terminal.

Therefore, the visibility of the image displayed on the display screen needs to be maintained even if the environment changes, and particularly, it is necessary to prevent the visibility of the image from being reduced due to a high illuminance environment.

SUMMARY OF THE INVENTION

An aspect of the present invention is to provide an apparatus and method for improving visibility of an image in a high-illuminance environment by performing color gamut mapping in one physical display apparatus.

Aspects of the present invention are not limited to those mentioned above, and other objects of the present invention will be apparently understood by those skilled in the art through the following description.

According to a first aspect of the present invention, there is provided an apparatus for improving visibility of an image, the apparatus including: an image input module receiving an image; an illuminance sensing module sensing external illuminance; a visibility compensating module compensating the input image by mapping the input image from a first color gamut to a second color gamut on the basis of the sensed external illuminance; and an image output module outputting the compensated image.

According to a second aspect of the present invention, there is provided an apparatus for improving visibility of an image, the apparatus including: a color gamut mapping module mapping an input image from a first color gamut to a second color gamut on the basis of external illuminance; and an image output module outputting the color-gamut-mapped image.

According to a third aspect of the present invention, there is provided an apparatus for improving visibility of an image, the apparatus including: an LUT generating module generating an LUT in which image data in a high illuminance environment corresponding to image data of an input image is set so as to increase lightness and chroma of the input image and correct a bluish hue according to external illuminance; and an image mapping module mapping the image data of the input image to the image data in the high illuminance environment on the basis of the generated LUT.

According to a fourth aspect of the present invention, there is provided a method of improving visibility of an image, the method including: receiving an image; sensing external illuminance; mapping the input image from a first color gamut to a second color gamut on the basis of the sensed external illuminance; and outputting the color-gamut-mapped image.

According to a fifth aspect of the present invention, there is provided a method of improving visibility of an image, the method including: mapping an input image from a first color gamut to a second color gamut on the basis of external illuminance; and outputting the color-gamut-mapped image.

According to a sixth aspect of the present invention, there is provided a method of improving visibility of an image, the method including: generating an LUT in which image data in a high illuminance environment corresponding to image data of an input image is set so as to increase lightness and chroma of the input image and correct a bluish hue according to external illuminance; and mapping the image data of the input image to the image data in the high illuminance environment on the basis of the generated LUT.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
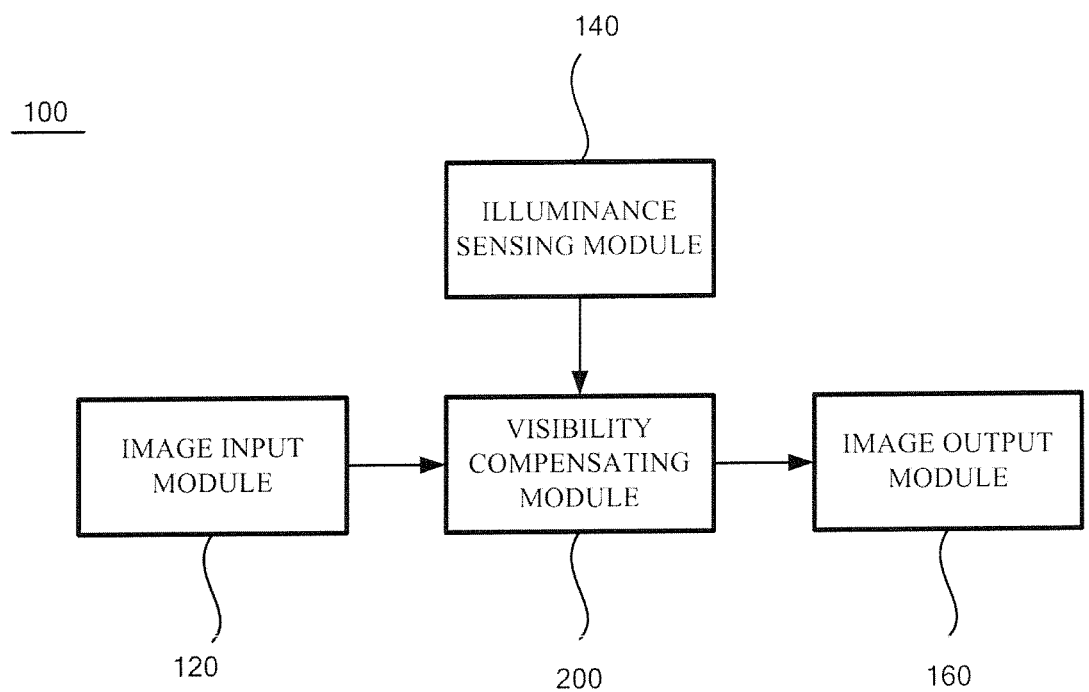
FIG. 1 is a block diagram illustrating the structure of an apparatus for improving visibility of an image according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention are described hereinafter with reference to block illustrations or flowchart illustrations of an apparatus and method for improving visibility of an image in a high illuminance environment according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory or medium that can direct a computer or other programmable data processing apparatus to function in a particular manner, such that the instructions stored in the computer usable or computer-readable memory or medium produce an article of manufacture including instruction means that implement the function specified in the flowchart block or blocks. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Meanwhile, the term "high illuminance environment" used in the following specification means an environment in which a user can scarcely recognize the image displayed on the display screen due to the high illuminance in the surrounding of the portable terminal or the user recognizes that image distortion (for example, variation in hue, brightness, or chroma) has occurred due to the surrounding high illuminance. Therefore, the high illuminance environment can be understood to mean an environment in which visibility of an image is reduced, rather than an environment in which the illuminance is higher than a specific value.

FIG. 1 is a block diagram illustrating the structure of an apparatus for improving visibility of an image according to an embodiment of the invention.

Referring to FIG. 1, an apparatus 100 for improving visibility of an image according to an embodiment of the invention includes an image input module 120, an illuminance sensing module 140, a visibility compensating module 200, and an image output module 160.

The image input module 120 includes image capturing elements for capturing an image and a captured image is input to the image input module 120.

The illuminance sensing module 140 includes an illuminance sensor for sensing the illuminance surrounding the apparatus 100, and provides sensed illuminance information to the visibility compensating module 200.

The visibility compensating module 200 compensates the visibility of the image input by the image input module 120 on the basis of the illuminance information supplied by the illuminance sensing module 140.

The image output module 160 provides the image compensated by the visibility compensating module 200 to a user through a display screen.

The term "module", as used herein, means, but is not limited to, a software or hardware component, such as a Field Programmable Gate Array(FPGA) or Application Specific Integrated Circuit(ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

When the image input by the image input module 120 is transmitted to the visibility compensating module 200, the visibility compensating module 200 compensates data of the input image on the basis of the illuminance information received from the illuminance sensing module 140 so as to improve the visibility of the image. In this case, the visibility compensating module 200 includes predetermined color gamut data in two different types of environments, and improves the visibility of the input image through mapping between the two color gamuts. That is, two kinds of color gamut data exist for an image display screen for one physical apparatus. Here, it is preferable that the two kinds of color gamut data be color gamut data in a darkroom environment and color gamut data in a high illuminance environment.

Figure 2:
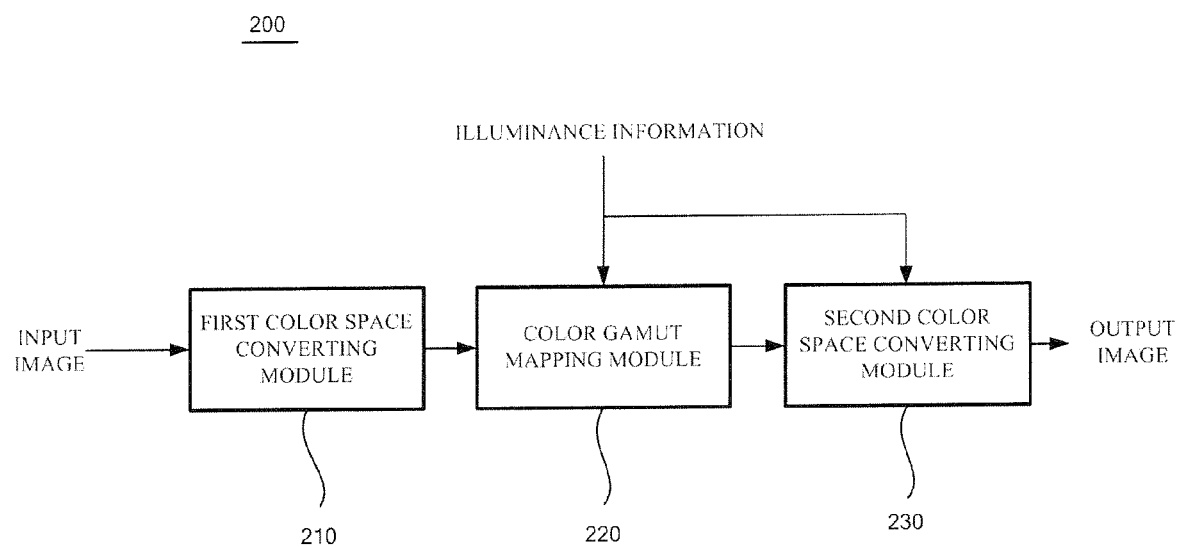
FIG. 2 is a block diagram illustrating the structure of a visibility compensating module according to an embodiment of the invention.

FIG. 2 is a block diagram illustrating the structure of the visibility compensating module according to the embodiment of the invention.

Referring to FIG. 2, the visibility compensating module 200 includes a first color space converting module 210, a color gamut mapping module 220, and a second color space converting module 230.

The first color space converting module 210 converts image data of the image input by the image input module 120 into coordinates in a color space for color gamut mapping.

The color gamut mapping module 220 performs color gamut mapping on the image data converted by the first color space converting module 210 on the basis of the illuminance information supplied by the illuminance sensing module 140 such that the visibility can be ensured in the high illuminance environment.

The second color space converting module 230 converts the image data whose color gamut has been mapped into an image on the basis of the illuminance information supplied by the illuminance sensing module 140, and the converted image will be showed to the user through the image output module 160.

Figure 3:
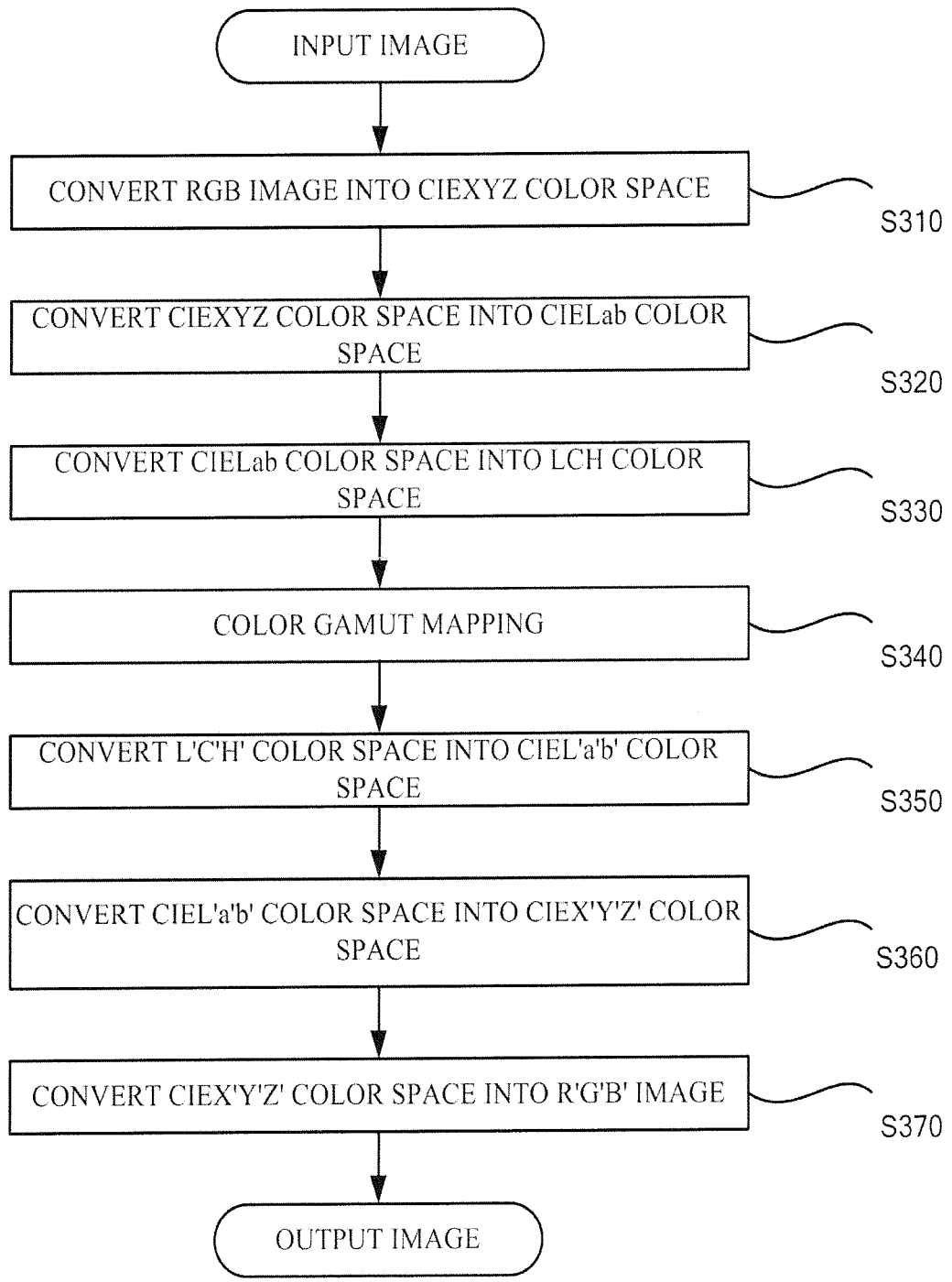
FIG. 3 is a flow chart illustrating a method of improving visibility of an image according to an embodiment of the invention.

The operation of the visibility compensating module illustrated in FIG. 2 will be described in detail with reference to a flow chart illustrated in FIG. 3.

First, the first color space converting module 210 converts the image data of the input image into coordinates in the color space for color gamut mapping. An example of the conversion process is performed through operations S310 to S330. More specifically, when the input image is composed of RGB image data, the first color space converting module 210 converts the RGB image data into coordinates in a CIEXYZ color space (operation S310). In this case, the conversion to coordinates is performed reflecting CIEXYZ characteristics for the display screen under a darkroom environment. Examples of the CIEXYZ characteristics include a gamma characteristic, a calorimetric characteristic, etc.

Then, the coordinates in the CIEXYZ color space are converted into coordinates in a CIELab color space (operation S320). This conversion is performed reflecting a white XYZ characteristic for the display screen under a darkroom environment.

Subsequently, the coordinates in the CIELab color space are converted into coordinates in an LCH (lightness, chroma, hue) color space (operation S330).

After the image data of the input image is finally converted into the coordinates in the LCH color space, the color gamut mapping module 220 performs color gamut mapping on the converted image data on the basis of the illuminance information sensed by the illuminance sensing module 140 (operation S340).

Figure 4:
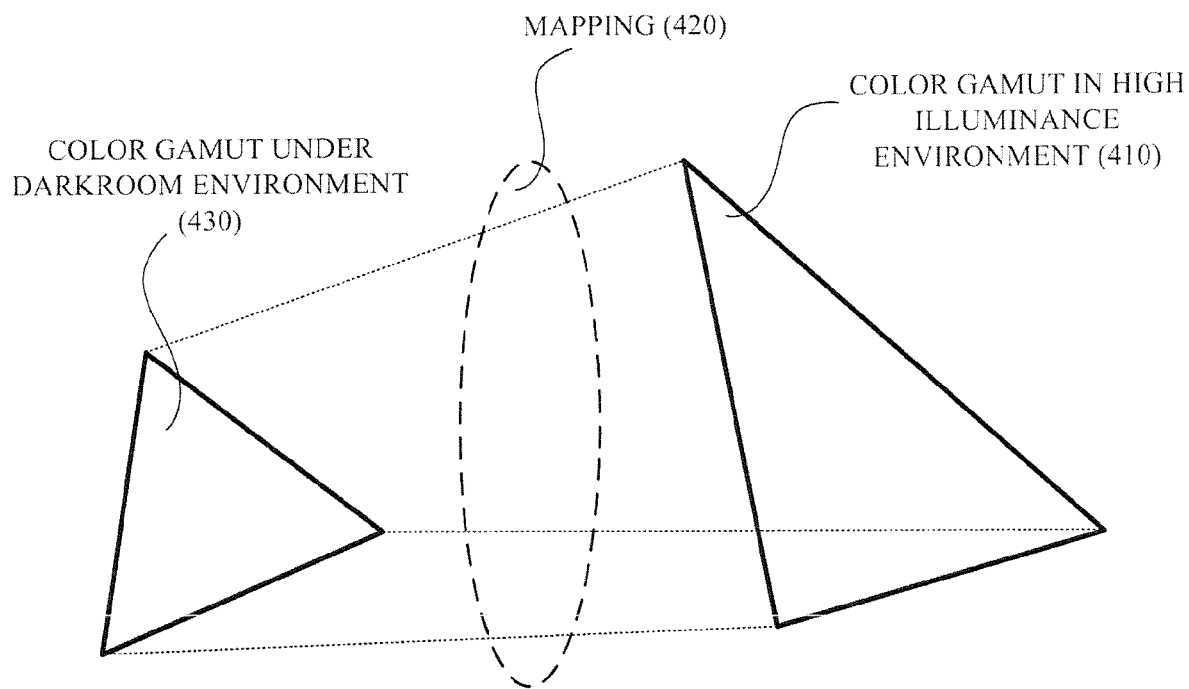
FIG. 4 is a view illustrating color gamut mapping according to an embodiment of the invention.

In this embodiment of the invention, color gamuts in two different types of environments are set and illustrated in FIG. 4.

Referring to FIG. 4, in the apparatus according to the embodiment of the invention, a color gamut 430 under the darkroom environment and a color gamut 410 in the high illuminance environment exist for the display screen. The color gamut mapping module 220 maps (see reference numeral 420) a pixel in the color gamut 430 under the darkroom environment to a pixel in the color gamut 410 in the high illuminance environment.

The mapping 420 is performed by adjusting lightness, chroma, and hue in the LCH color space, and the detailed method of the mapping is illustrated in FIGS. 5 to 8.

Figure 5:
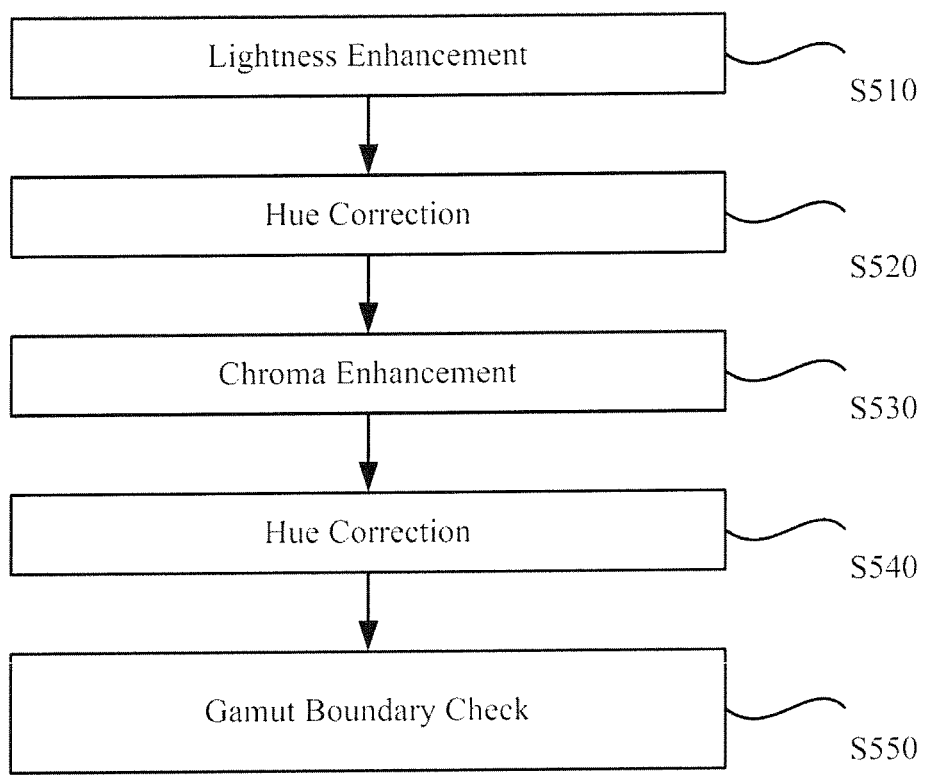
FIG. 5 is a flow chart representing a method of performing color gamut mapping according to an embodiment of the invention.
Figure 6:
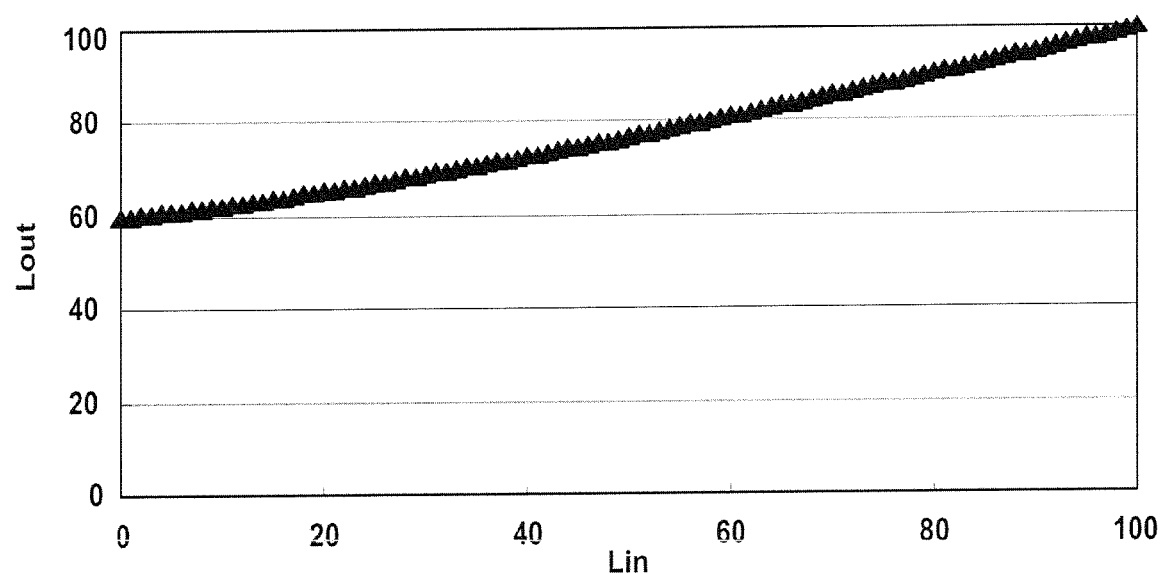
FIG. 6 is a view illustrating a graph used for increasing lightness according to an embodiment of the invention.

Referring to FIG. 5, first, the color gamut mapping module 220 increases the lightness of the image data in the LCH color space (operation S510). That is, the increase in lightness means increasing illuminance. More specifically, the increase in lightness is performed using a graph illustrated in FIG. 6. In FIG. 6, a horizontal axis and a vertical axis each represent lightness from 0 (black) to 100 (white). Referring to FIG. 6, for example, when the lightness data on an arbitrary pixel in the LCH color space is 0, the lightness data on the corresponding pixel is increased to 60.

A lightness increase characteristic according to the invention has a feature in which, as lightness data on an arbitrary pixel in the LCH color space increases from 0, lightness data on the vertical axis gradually increases from 60. In this embodiment, when the lightness data on the arbitrary pixel in the LCH color space is 0, the increased lightness data Lout on the corresponding pixel is 60. However, the invention is not limited thereto. As long as Lout can ensure visibility, any Lout within the scope of the invention can be used.

When the lightness increases, the luminance increases. In this case, the bluish hue perceived by the user is generally changed. For this reason, the color gamut mapping module 220 corrects the bluish hue (operation S520).

Figure 7:
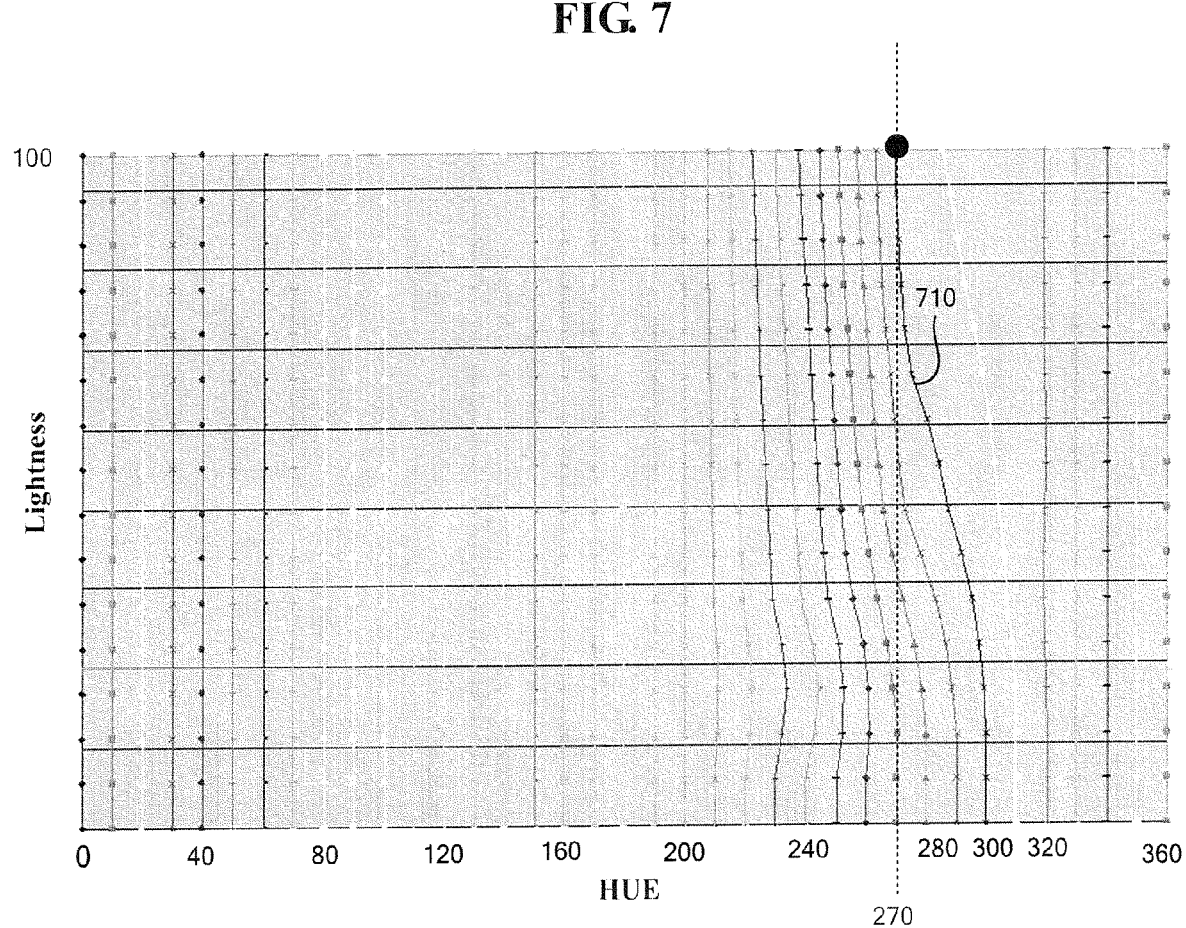
FIG. 7 is a view illustrating a graph used for hue correction according to an embodiment of the invention.

A hue correcting method uses a graph illustrated in FIG. 7. In FIG. 7, the bluish hue exists between 200 and 320 in a horizontal axis representing a hue value and lightness data represented by a vertical axis is scaled from 0 to 100.

For example, referring to a graphic curve 710 corresponding to a hue value of 300, it can be seen that, when lightness data is 100, the graphic curve 710 corresponds to a hue value of about 270. That is, even though the lightness of pixel data corresponding to the hue value of 300 is increased by correcting the hue value to 270, the user cannot visually notice the bluish hue having deteriorated. Referring to the graph illustrated in FIG. 7, it can be seen that, as the lightness increases, the hue value of the bluish hue decreases.

After performing the above-mentioned hue correction, chroma is increased (operation S530). A chroma increasing method can use a graph illustrated in FIG. 8.

Figure 8:
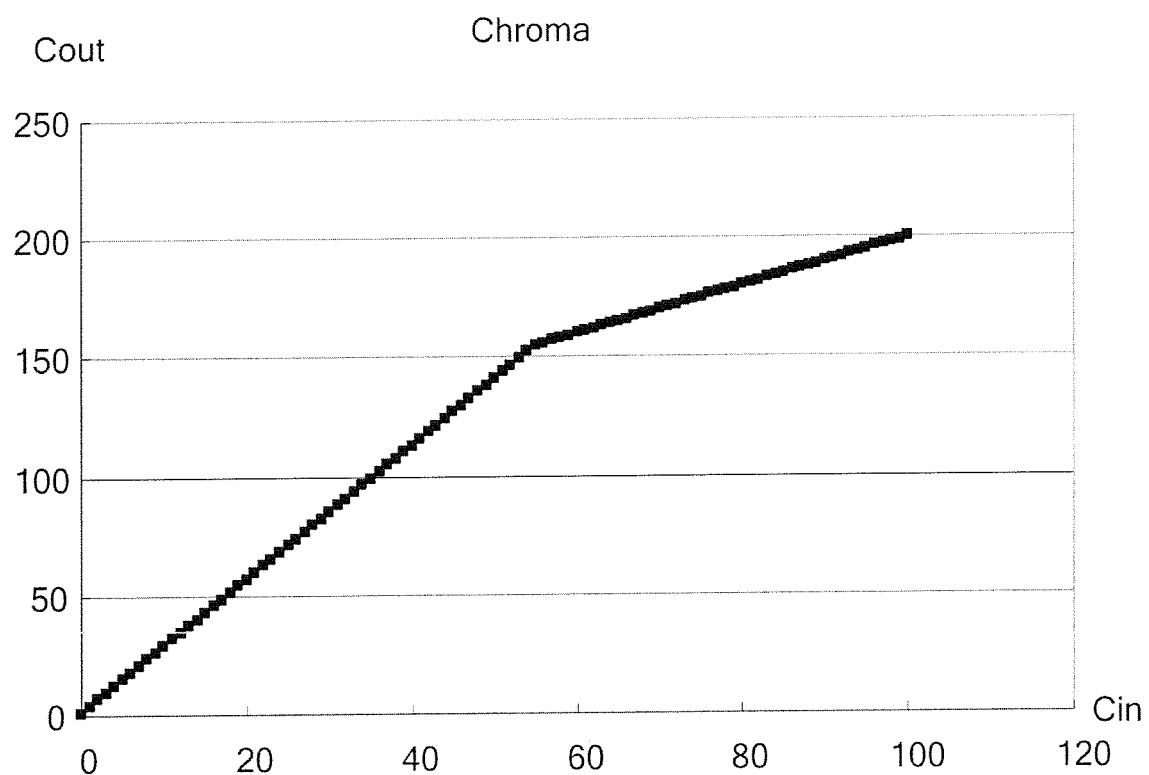
FIG. 8 is a view illustrating a graph used for increase chroma according to an embodiment of the invention.

Referring to FIG. 8, a horizontal axis representing a chromatic value of an arbitrary pixel is scaled from 0 to 100, and a vertical axis represents an increased chromatic value of the corresponding pixel.

FIG. 8 illustrates an example of a graph used for increasing chroma, and the amount of the increase to ensure the visibility of the image can be obtained by an experiment.

Not only the graph illustrated in FIG. 8, but also any graph capable of ensuring the visibility of the image by increasing the chroma can be applied to this invention for increasing the chroma.

After increasing the chroma according to the above-mentioned method, the bluish hue may be distorted due to the increase in chroma. For this reason, the color gamut mapping module 220 performs hue correction one more time as in operation S520 (operation S540).

Then, it is checked whether the pixel data of the input image whose lightness, chroma, and hue have been corrected exists inside the boundary of the color gamut 410 in the high illuminance environment illustrated in FIG. 4, thereby confirming whether the mapping 420 between the color gamut 430 under the darkroom environment and the color gamut 410 in the high illuminance environment is correctly performed.

When the color gamut mapping with respect to the input image is performed in the above-mentioned way to acquire coordinates in an L'C'H' color space, the coordinates in the L'C'H' color space are converted into coordinates in a CIEL'a'b' color space (operation S350).

Then, the coordinates in the CIEL'a'b' color space are converted into coordinates in a CIEX'Y'Z' color space (operation S360). This coordinate conversion is performed reflecting CIEX'Y'Z' characteristics with respect to the display screen in the high illuminance environment. Examples of the CIEX'Y'Z' characteristics include a gamma characteristic, a calorimetric characteristic, etc.

Subsequently, the coordinates in the CIEX'Y'Z' color space are converted into R'G'B' image data so as to output an RGB image having improved visibility. When the coordinates in the CIEX'Y'Z' color space are converted into the R'G'B' image data, a white X'Y'Z' characteristic with respect to the display screen in the high illuminance environment is reflected.

Meanwhile, in this embodiment, in order to perform color gamut mapping on the input image to obtain an image having improved visibility, the color coordinates are converted by the first and second color space converting modules 210 and 230. The above-mentioned converting process is an example. In this embodiment, the first color space converting module 210 can be understood as a module for providing a function to convert the input image into the coordinates into the color space for color gamut mapping by reflecting the characteristics of the display screen under the darkroom environment, and the second color space converting module 230 can be understood as a module for providing a function to inversely perform the color coordinate conversion performed by the first color space converting module 210.

Figure 9:
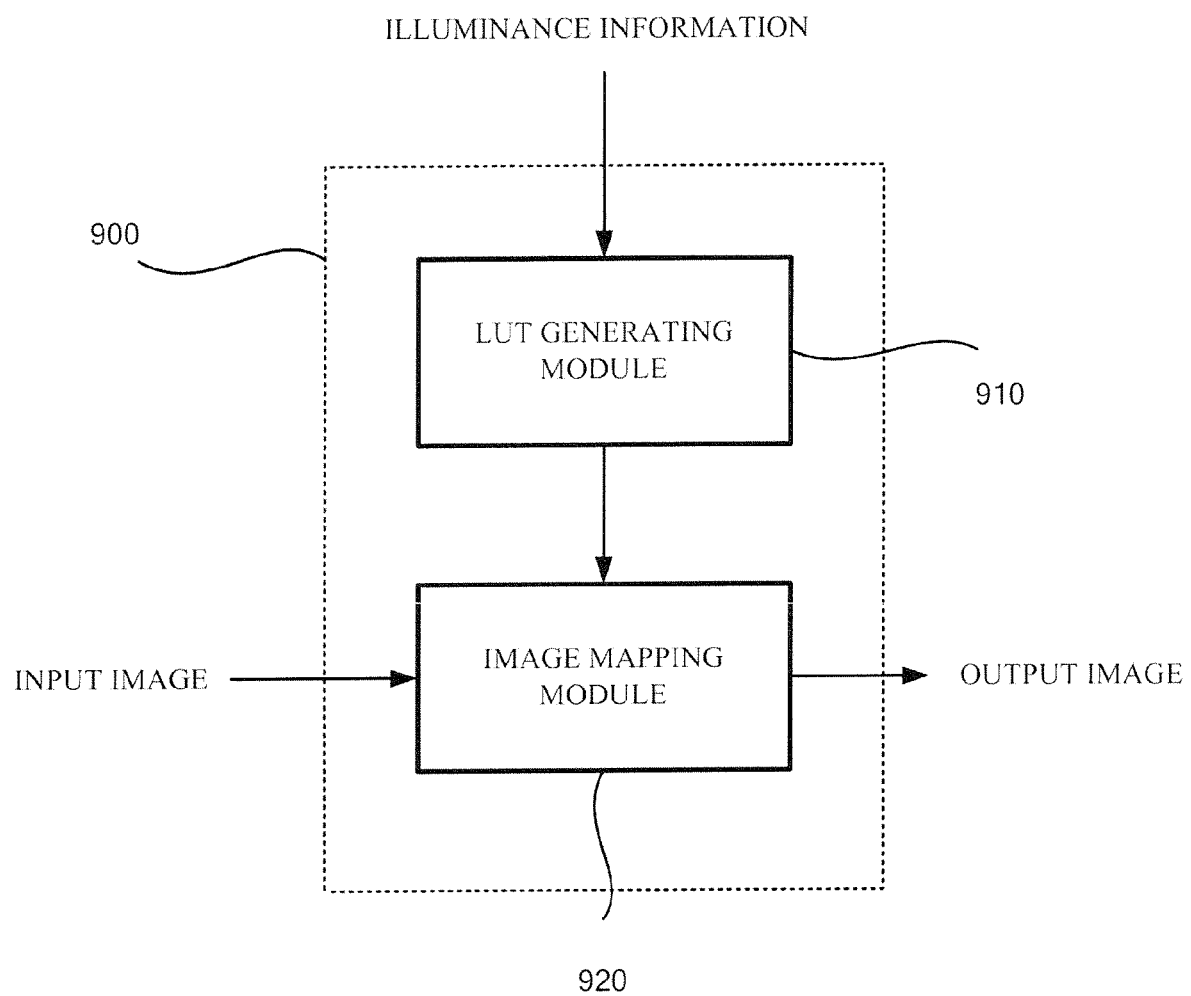
FIG. 9 is a block diagram illustrating the structure of a visibility compensating module according to another embodiment of the invention.

FIG. 9 is a block diagram illustrating the structure of a visibility compensating module according to another embodiment of the invention.

A visibility compensating module 900 illustrated in FIG. 9 corresponds to the visibility compensating module 200 illustrated in FIG. 1, and includes an LUT (Lookup Table) generating module 910 and an image mapping module 920.

Figure 10:
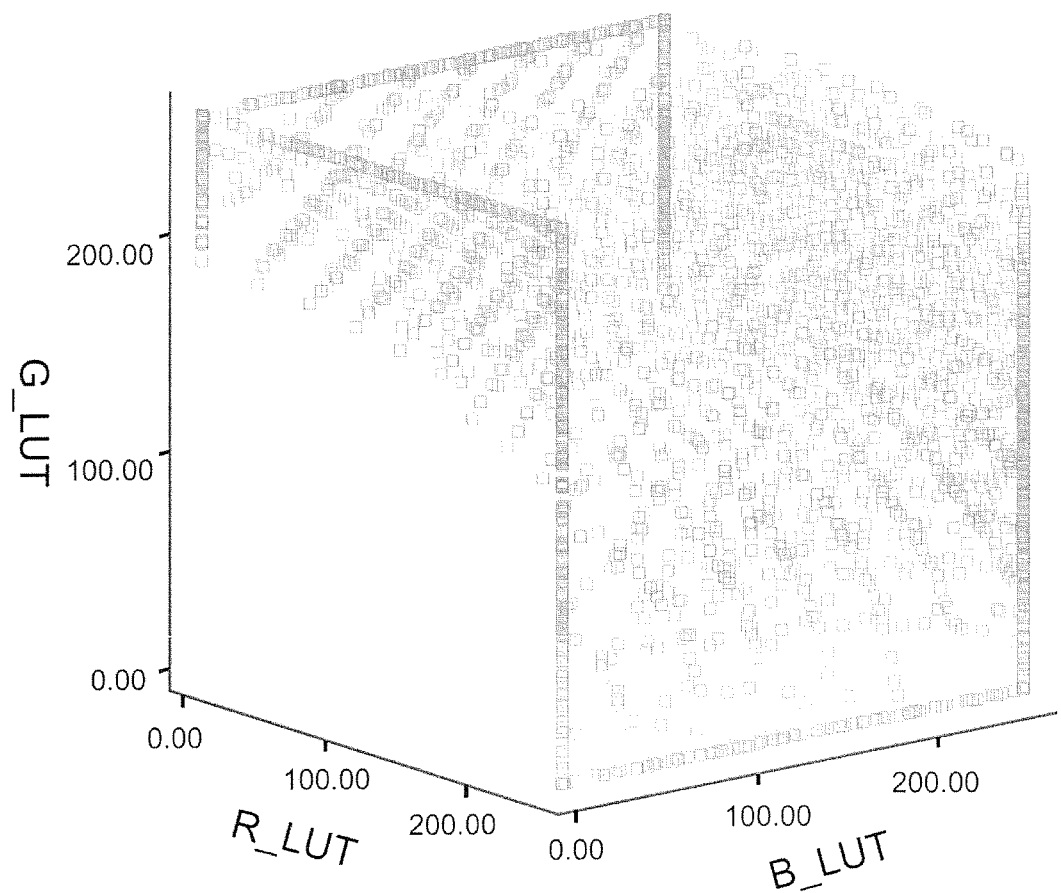
FIG. 10 is a view illustrating a lookup table (LUT) according to another embodiment of the invention.

In this embodiment, the LUT generating module 910 can generate an RGB LUT on the basis of the illuminance information, as illustrated in FIG. 10. The RGB LUT has a feature that can improve the overall luminance while improving the lightness of a black color, and improve the chroma. The RGB LUT preferably has a feature that improves lightness and chroma and compensates the bluish hue as illustrated in FIGS. 6 to 8.

The image mapping module 920 maps the RGB image data of the input image into image data in the high illuminance environment by using the RGB LUT generated by the LUT generating module 910.

If image data corresponding to the RGB image data of an arbitrary pixel of the input image is not set in the generated RGB LUT, the image data of the corresponding pixel can be constructed by interpolation using the image data corresponding to the RGB image data of adjacent pixels to perform the mapping. In this case, the interpolation may be performed by a conventional interpolation method.

Although aspects of the present invention have been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to aspects of the present invention, it is possible to increase the lightness and chroma of the image displayed on the display screen under a high illuminance environment and to prevent a change in the bluish hue.

What is claimed is:

1. An apparatus for improving visibility of an image, the apparatus comprising:
   a processor couple to a memory;
   an image input module receiving an image;
   an illuminance sensing module sensing external illuminance;
   a visibility compensating module compensating the input image by mapping the input image from a first color gamut to a second color gamut according to the sensed external illuminance, the second gamut being a color gamut in a high illuminance environment in which the external illuminance is greater than the luminance of a display device; and
   an image output module outputting the compensated image,
   wherein the visibility compensating module comprises:
   a first color space converting module converting image data of the input image into coordinates in a color space for a color gamut mapping in consideration of characteristics of a screen of the image output module under a darkroom environment;
   a color gamut mapping module mapping the converted image data from the first color gamut to the second color gamut; and
   a second color space converting module converting the color-gamut-mapped image data into an image to be displayed to a user according to the sensed external illuminance,
   wherein the color gamut mapping module increases a lightness and a chroma of the image data in the first color gamut, and
   wherein the color gamut mapping module corrects hue data of the image data in the first color gamut.

2. The apparatus of claim 1, wherein the first color gamut is a color gamut under a darkroom environment.

3. The apparatus of claim 1, wherein the second color space converting module inversely performs a converting process of the first color space converting module.

4. The apparatus of claim 1, wherein, when lightness data of the image in the first color gamut corresponds to black, the lightness data is increased to a lightness capable of ensuring visibility.

5. The apparatus of claim 1, wherein an amount of increase of the chroma of the image data in the first color gamut varies.

6. The apparatus of claim 1, wherein the corrected hue data corresponds to a bluish hue.

7. The apparatus of claim 6, wherein the color gamut mapping module corrects the bluish hue by decreasing a hue value of the bluish hue.

8. A method of improving visibility of an image, the method comprising:
   receiving an image;
   sensing external illuminance;
   mapping the input image from a first color gamut to a second color gamut according to the sensed external illuminance, the second gamut being a color gamut in a high illuminance environment in which the external illuminance is greater than the luminance of a display device; and
   outputting the color-gamut-mapped image,
   wherein the color gamut mapping of the input image comprises:
   converting image data of the input image into coordinates in a color space for a color gamut mapping in consideration of characteristics of a screen on which the color-gamut-mapped image is output under a darkroom environment;
   mapping the converted image data from the first color gamut to the color second gamut; and
   converting the color-gamut-mapped image data into an image to be displayed to a user according to the sensed external illuminance,
   wherein the color the gamut mapping of the converted image data comprises increasing a lightness and a chroma of the image data in the first color gamut, and wherein the color gamut mapping of the converted image data further comprises correcting hue data of the image data in the first color gamut.

9. The method of claim 8, wherein the first color gamut is a color gamut under a darkroom environment.

10. The method of claim 8, wherein, when lightness data of the image in the first color gamut corresponds to black, the lightness data is increased to a lightness capable of ensuring visibility.

11. The method of claim 8, wherein an amount of increase of the chroma of the image data in the first color gamut varies.

12. The method of claim 8, wherein the corrected hue data corresponds to a bluish hue.

13. The method of claim 12, wherein the bluish hue is corrected by decreasing a hue value of the bluish hue.

14. A method of improving visibility of an image, the method comprising:

mapping an input image from a first color gamut to a second color gamut according to an external illuminance, the second gamut being a color gamut in a high illuminance environment in which the external illuminance is greater than the luminance of a display device; and outputting the color-gamut-mapped image, wherein the color gamut mapping of the input image comprises:

converting image data of the input image into coordinates in a color space for a color gamut mapping in consideration of characteristics of a screen on which the color-gamut-mapped image is output under a darkroom environment;

mapping the converted image data from the first color gamut to the color second gamut; and converting the color-gamut-mapped image data into an image to be displayed to a user according to the sensed external illuminance, wherein the color the gamut mapping of the converted image data comprises increasing a lightness and a chroma of the image data in the first color gamut, and wherein the color gamut mapping of the converted image data further comprises correcting hue data of the image data in the first color gamut.

15. The method of claim 14, wherein the first color gamut is a color gamut under a darkroom environment.

* * * * *